United States Patent [19]
Forster

[11] Patent Number: 5,467,597
[45] Date of Patent: Nov. 21, 1995

[54] HYDROMECHANICAL TRANSMISSION

[75] Inventor: Franz Forster, Karlstadt-Muhlbach, Germany

[73] Assignee: Linde Aktiengesellschaft, Germany

[21] Appl. No.: 23,929

[22] Filed: Feb. 26, 1993

[30]     Foreign Application Priority Data

Feb. 27, 1992 [DE] Germany .......................... 42 06 102.4

[51] Int. Cl.⁶ .................................................. F16D 31/02
[52] U.S. Cl. ................................ 60/442; 92/12.1
[58] Field of Search ........................... 60/435, 436, 442; 92/12.2, 71

[56]               References Cited
               U.S. PATENT DOCUMENTS

| | | | |
|---|---|---|---|
| 3,508,401 | 4/1970 | Aplin ........................................ | 60/442 |
| 3,527,144 | 9/1970 | Firth et al. ................................ | 60/466 |
| 3,935,796 | 2/1976 | Wood ........................................ | 92/12.2 |
| 3,967,541 | 7/1976 | Born et al. ................................ | 92/12.2 |
| 4,040,312 | 8/1977 | Tappan et al. ............................ | 475/83 |
| 4,455,920 | 6/1984 | Shaw et al. ................................ | 92/12.2 |
| 4,583,425 | 4/1986 | Mann et al. ................................ | 74/730 |
| 4,930,312 | 6/1990 | Metcalf ...................................... | 60/442 |
| 4,951,551 | 8/1990 | Arai et al. .................................. | 91/506 |
| 5,101,630 | 4/1992 | Wagenseil .................................. | 60/435 |

FOREIGN PATENT DOCUMENTS 48646  3/1986  Japan ............................ 475/83

*Primary Examiner*—F. Daniel Lopez
*Attorney, Agent, or Firm*—Webb Ziesenheim Bruening Logsdon Orkin & Hanson

[57]            ABSTRACT

A hydromechanical transmission which includes a swash-plate type hydrostatic axial piston motor with a rotary cylindrical drum having work cylinders and a driven shaft. A planetary gear is located adjacent to and coaxial with the piston motor and includes a rotary hub surrounding both the planetary gear and the axial piston motor, A ring gear is located at the inner surface of the rotary hub and a stationary hub support having an open ended cavity to hold the axial piston motor is mounted within and coaxial with the rotary hub. The end wall of the cavity is a control surface for the axial piston motor and pressure medium channels which open on the control surface for periodic connection with the work cylinders in the cylindrical drum are formed in the stationary hub support.

14 Claims, 2 Drawing Sheets

HYDROMECHANICAL TRANSMISSION

BACKGROUND OF THE INVENTION

1. Field of the Invention

The invention relates generally to a hydromechanical transmission having a hydrostatic swash-plate type axial piston motor and a downstream planetary gear coaxial with the axial piston motor and having at least a single stage. The ring gear of the planetary gear is located on the inner surface of a hub which surrounds the planetary gear and the axial piston motor is mounted in a hub support.

2. Description of the Prior Art

A transmission with a partly integrated axial piston motor which is intended to drive a crawler or the final drive for a utility vehicle is disclosed in U.S. Pat. No. 4,583,425. Although hydromechanical transmissions of the prior art include an axial piston motor having a cylindrical drum wherein the swash plate is located in a cavity formed by a hub support acting as a web to reduce the length of the hydromechanical transmission compared to other hydromechanical transmissions, other components are required which increase the hydromechanical transmission length and the number of individual components.

SUMMARY OF THE INVENTION

An object of the invention is to reduce the length of a hydromechanical transmission and simplify its design.

To achieve this object, the transmission of the invention provides the control surface of the axial piston motor on the end wall of the hub support adjacent to the planetary gear. The conduits for supplying a pressure medium to the work cylinders of the cylindrical drum are located in the wall of the hub support and open on the control surface. The location of the pressure medium supply conduits in the hub support which also includes the control surface reduces the length of the transmission by eliminating the control floor seat as required in prior art transmissions. Furthermore, the transmission of the invention requires fewer individual parts, which reduces fabrication costs and assembly time.

The number of individual parts in the transmission of the invention is further reduced because the hub support functions as the housing for the axial piston motor. In prior art hydromechanical transmissions, the axial piston motor is located in a separate housing carried by the hub support.

The length of a hydromechanical transmission according to the invention can be further reduced by locating various valves for operating the axial piston motor in the end portion of the hub support spaced from the control surface.

It is particularly advantageous to form the cavity in the hub support as a cylindrical blind hole and to connect the swash plate on a cylindrical disk-shaped swash plate seat which is connected to or formed on the hub support. The outer diameter of the swash plate seat corresponds to the diameter of the blind hole. Thus, by simply changing the swash plate seat, an axial piston motor with a constant or a variable intake volume can be achieved.

In the event an axial piston motor with a variable intake volume is used, an arrangement is located in the swash plate seat to adjust the swash plate. Other valves and control elements can also be located in the swash plate seat. For example, it is possible to integrate the distribution valve for activating the axial piston motor in the swash plate seat and to electromagnetically activate this valve from a remote control panel. This arrangement eliminates losses normally caused by hydraulic tubes or hose lines.

Furthermore, it is advantageous to provide the swash plate seat with a central recess to receive the driven shaft of the axial piston motor. In such an arrangement, the swash plate seat forms the axial end of the hydromechanical transmission and a separate housing element is not required.

In order to fully utilize the available radial space, axially shiftable annular brake plates are located between the outer circumference of the cylindrical drum and the inner wall of the hub support. At least one annular brake plate is non-rotatably connected to the cylindrical drum and at least one annular brake plate is non-rotatably connected to the hub support. The annular brake plates are shiftable in one direction by a spring and a device is provided which receives a pressure medium to exert a force on the brake plates counter to the force of the spring. This device includes a ring cylinder and a ring piston which work in conjunction with each other.

It will be understood by those skilled in the art that the invention is not restricted to a single-stage planetary gear. If a larger reduction range is desired, the planetary gear will have first and second stages. In this arrangement, the sun gear of the first stage is non-rotatably connected to the driven shaft of the axial piston motor and the ring gear is non-rotatably connected to the hub. The web of the first stage is connected to the sun gear between the first stage and the second stage. The web of the second stage is connected to the hub support and the ring gear is connected to the hub. The fabrication of such a hydromechanical transmission with a two-stage planetary gear is simplified because the ring gears are formed by a common toothed gear which may be formed integrally on the inner surface of the hub.

A complete understanding of the invention will be obtained from the following description when taken in connection with the accompanying drawings wherein like reference characters identify like parts throughout.

DESCRIPTION OF THE PREFERRED EMBODIMENTS

Figure 1:
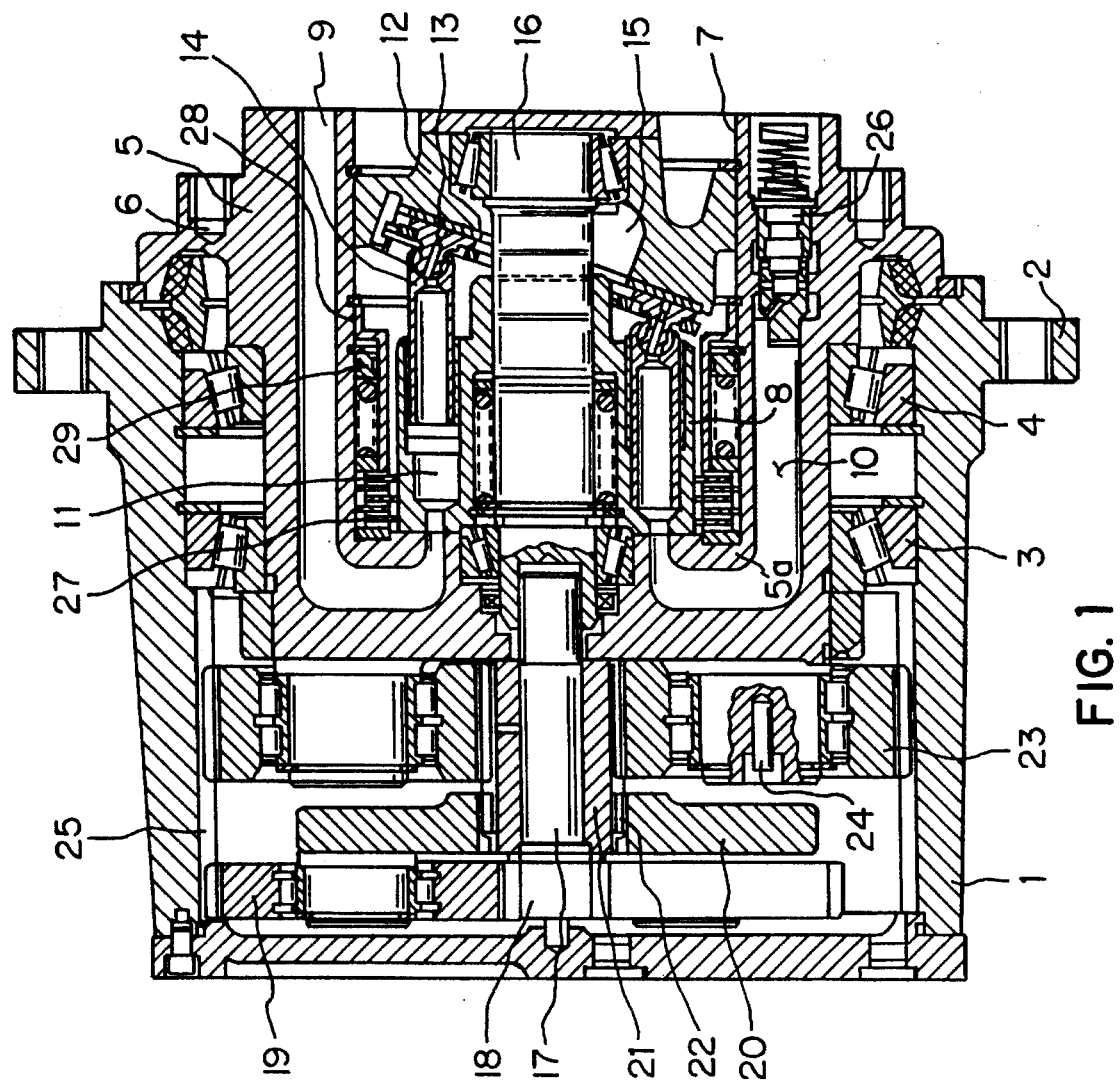
FIG. 1 is a longitudinal section through a hydromechanical transmission according to the invention having a constant intake volume axial piston motor.

The embodiment of the hydromechanical transmission shown in FIG. 1 of the drawings has a hub 1 with a connecting flange 2 formed thereon for attaching it to a tumbler gear of a crawler track. Hub 1 is rotatably mounted on a stationary hub support 5 by roller bearings 3 and 4. Stationary hub support 5 has threaded holes 6 for attaching it to a vehicle frame.

A cavity 7 in the form of a cylindrical blind hole is formed in hub support 5 and an axial piston motor with a swash plate is located in cavity 7. An end wall 5a of stationary hub support 5 functions as the control surface of the axial piston motor. The control surface may be formed directly on the end wall or it may be formed on a disk attached to the end wall. The cylindrical drum 8 of the axial piston motor rests against the control surface and channels 9 and 10 for a pressure medium are formed in stationary hub support 5 and open parallel to the axis of rotation of the axial piston motor.

When cylindrical drum 8 is rotating, work cylinders 11 are periodically in contact with pressure medium channels 9 and 10.

A cylindrical disk-shaped swash plate seat 12 is located at the open end of cavity 7. The seat has a non-adjustable swash plate 13 arranged at an angle to the axis of rotation of cylindrical drum 8 and work pistons 14 which move longitudinally in work cylinders 11 are connected to the swash plate. Swash plate 13 and swash plate seat 12 have a central recess 15 and the end of a driven shaft 16 of the axial piston motor is supported in a bearing located in the recess. An additional support point for driven shaft 16 is a bearing located in end wall 5a of hub support 5.

Driven shaft 16 is non-rotatably connected to a gear shaft 17 having a sun gear 18 on its distal end to form the first stage of a planetary gear. Sun gear 18 is connected to planetary gears 19 which are mounted on a web 20 which is non-rotatably connected to a sleeve shaft 21 which is rotatably mounted on gear shaft 17. A sun gear 22 of the second stage of the planetary gear is formed on sleeve shaft 21. Planetary gears 23 which are connected to sun gear 22 are mounted on pivots 24 which are located on end wall 5a of stationary hub support 5. Hub support 5 thus serves as the rigid web of the second stage of the planetary gear. If desired, it is possible to have a planetary gear with more than two stages, wherein the web of the last stage will be formed by stationary hub support 5. Planetary gears 19 of the first stage of the planetary gear and planetary gears 23 of the second stage of the planetary gear are connected to a common ring gear 25 which is located on the inside surface of hub 1. A brake valve 26 is located in each pressure medium channel 9 and 10; only the brake valve in pressure medium channel 10 is shown in FIG. 1 of the drawings. Other valves can be located in stationary hub support 5 or in swash plate seat 12.

The brake valve and the function thereof are well-known to those skilled in the art. Such a valve is provided in hydrostatic circuits to prevent the hydraulic motor from operating at a runaway overspeed if energy is provided to the hydraulic motor from outside the hydrostatic circuit such as when the hydraulic motor operates as a pump when a vehicle having a hydrostatic drive system is traveling downhill. The brake valve which is located between the motor and the tank prevents the motor from increasing its speed over a preset critical value. The brake valve thus functions as a throttle valve as it provides a resistance in the line between the hydrostatic motor and the tank. The brake valve has an open position and a throttling position, and under normal conditions, it will be opened by the pressure between the pump and the motor. However, when energy is provided to the pump from outside of the hydraulic circuit, such as during downhill travel, the pressure between the pump and the motor drops so that the brake valve moves into the throttling position, thereby preventing the motor from overspeeding. The force of the spring in the brake valve provides the brake valve to be in the throttling position. Thus, the brake valve will begin to close to exert a braking action on the hydrostatic motor which limits the speed of the motor.

Alternate spaced annular brake plates 27 are non-rotatably connected to the outer surface of cylindrical drum 8 and to the inner surface of stationary hub support 5. The brake plates can be moved axially by a spring device having a ring cylinder 28 and a ring piston 29 working in conjunction with it which are contacted by a pressure medium to exert a force opposite the force of the spring.

Figure 2:
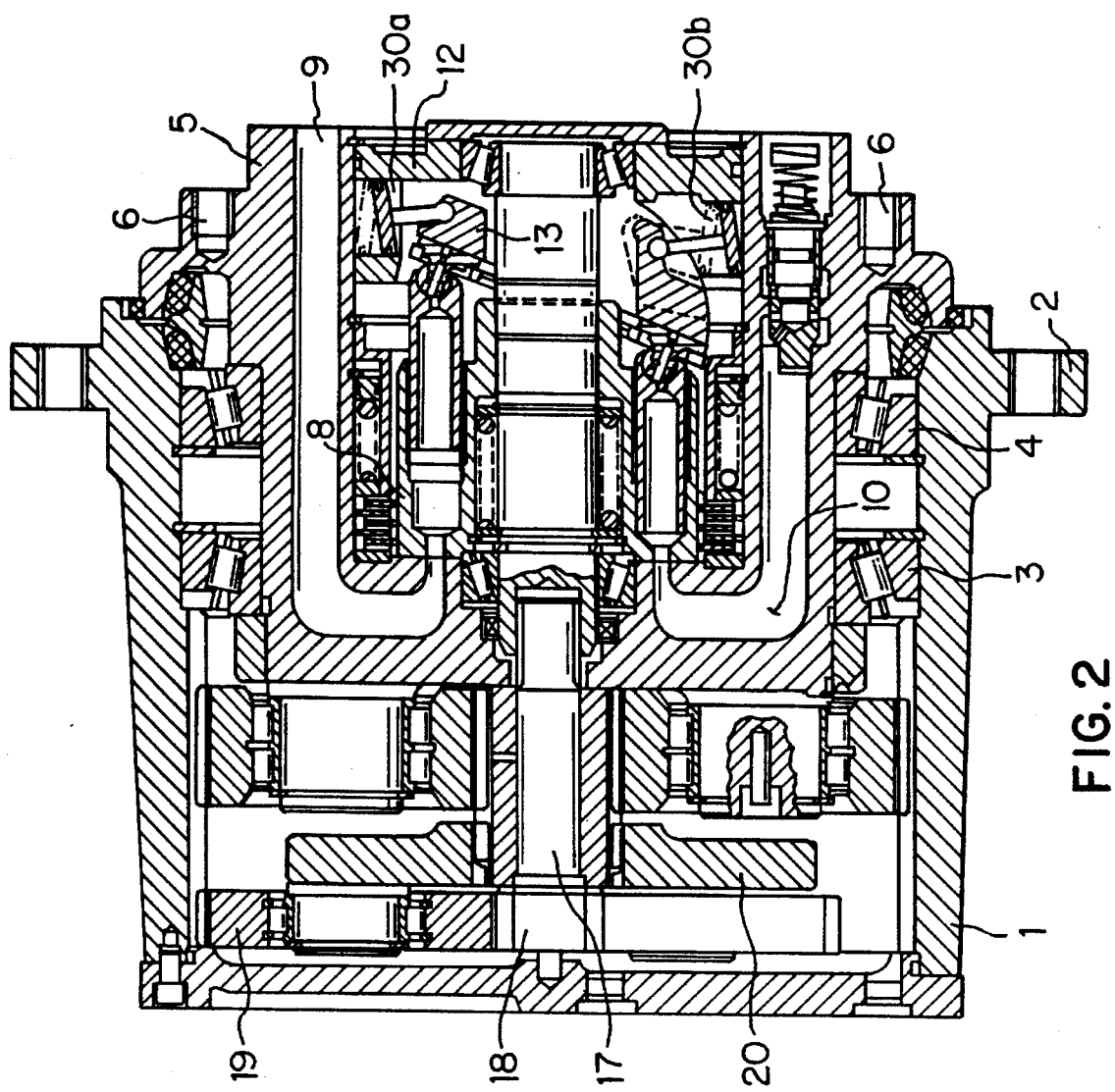
FIG. 2 is a longitudinal section through a second embodiment of the invention wherein the hydromechanical transmission has a variable intake volume axial piston motor.

The embodiment shown in FIG. 2 of the drawings is different from the embodiment shown in FIG. 1 of the drawings in that the pivot angle of swash plate 13 and swash plate seat 12 can be adjusted to vary the intake volume of the axial piston motor. The pivot angle is adjusted by two single-acting adjustment cylinders 30a and 30b, which are nearly perpendicular to the axis of rotation of the axial piston motor.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A hydromechanical transmission including a hydrostatic axial piston motor having a swash plate, a cylindrical drum, work cylinders located in said cylindrical drum and a driven shaft, at least a single-stage planetary gear axially adjacent to and coaxial with said piston motor, said planetary gear having a rotary hub radially surrounding said planetary gear and said axial piston motor, said rotary hub having an annular inner surface and a ring gear located at said annular inner surface of said rotary hub, a stationary hub support member, said stationary hub support member having an axial cavity formed therein to receive said axial piston motor and said axial piston motor mounted within said cavity coaxial with said rotary hub, said cavity having an end wall forming a control surface for said axial piston motor, a plurality of pressure medium channels formed in said stationary hub support, each of said pressure medium channels having an inlet end and an outlet end, said outlet ends opening on said control surface for connection with said work cylinders in said cylindrical drum.

2. A hydromechanical transmission as set forth in claim 1, including at least one pressure control valve located in the inlet end of at least one of said pressure medium channels formed in said stationary hub support member.

3. A hydromechanical transmission as set forth in claim 2, wherein said at least one pressure control valve is a brake valve, whereby said brake valve prevents said axial motor from overspeeding when energy is provided to said axial motor from outside the hydraulic circuit.

4. A hydromechanical transmission as set forth in claim 3, wherein said cavity in said stationary hub support member is a cylindrical blind hole and a cylindrical disk-shaped swash plate seat having an outer diameter corresponding to the diameter of said blind hole located at the open end of said cavity, whereby said swash plate is connected to said disk-shaped swash plate seat.

5. A hydromechanical transmission as set forth in claim 2, wherein said cavity in said stationary hub support member is a cylindrical blind hole and a cylindrical disk-shaped swash plate seat having an outer diameter corresponding to the diameter of said blind hole located at the open end of said cavity, whereby said swash plate is connected to said disk-shaped swash plate seat.

6. A hydromechanical transmission as set forth in claim 1, wherein said cavity in said stationary hub support member is a cylindrical blind hole and a cylindrical disk-shaped swash plate seat having an outer diameter corresponding to the diameter of said blind hole located at the open end of said cavity, whereby said swash plate is connected to said disk-shaped swash plate seat.

7. A hydromechanical transmission as set forth in claim 6, wherein said axial piston motor has a variable intake volume and including means extending between said disk-shaped swash plate and said stationary hub support for adjusting a position of said swash plate.

8. A hydromechanical transmission as set forth in claim 7, wherein said disk-shaped swash plate seat has a central recess formed therein, a bearing in said recess and an end of said driven shaft of said axial piston motor mounted in said bearing.

9. A hydromechanical transmission as set forth in claim 6, including spaced axially movable annular brake plates located between the outer surface of said cylindrical drum and the inner surface of said stationary hub support, at least one of said brake plates non-rotatably connected to said cylindrical drum and at least one of said brake plates non-rotatably connected to said stationary hub support, a spring adapted to contact one of said spaced brake plates to move said at least one spaced brake plate in the axial direction and means responsive to a pressure medium for exerting a force on one of said spaced plates opposite to the force of said spring.

10. A hydromechanical transmission as set forth in claim 9, wherein said means responsive to a pressure medium includes a ring cylinder and a ring piston working in conjunction with said ring cylinder, whereby a pressure medium exerts a force on said ring piston opposite the force of said spring.

11. A hydromechanical transmission as set forth in claim 1, including spaced axially movable annular brake plates located between the outer surface of said cylindrical drum and the inner surface of said stationary hub support, at least one of said brake plates non-rotatably connected to said cylindrical drum and at least one of said brake plates non-rotatably connected to said stationary hub support, a spring adapted to contact one of said spaced brake plates to move said at least one spaced brake plate in the axial direction and means responsive to a pressure medium for exerting a force on one of said spaced plates opposite to the force of said spring.

12. A hydromechanical transmission as set forth in claim 11, wherein said means responsive to a pressure medium includes a ring cylinder and a ring piston working in conjunction with said ring cylinder, whereby a pressure medium exerts a force on said ring piston opposite the force of said spring.

13. A hydromechanical transmission as set forth in claim 1, wherein said planetary gear has a first stage and second stage, a sun gear in said second stage non-rotatably connected to said driven shaft of said axial piston motor, a ring gear in said second stage non-rotatably located at said inner surface of said rotary hub, a web in said first stage non-rotatably connected to a first stage sun gear and an end of said stationary hub support forms a web in said second stage.

14. A hydromechanical transmission as set forth in claim 13, wherein said ring gear in said first stage and said ring gear in said second stage are formed as a single elongated gear.

* * * * *

UNITED STATES PATENT AND TRADEMARK OFFICE
CERTIFICATE OF CORRECTION

PATENT NO. : 5,467,597
DATED : November 21, 1995
INVENTOR(S) : Franz Forster

It is certified that error appears in the above-indentified patent and that said Letters Patent is hereby corrected as shown below:

Abstract Line 6 "motor," should read --motor.--.

Claim 13 Line 21 Column 6 after "inner" insert --annular--.

Signed and Sealed this

Twenty-sixth Day of March, 1996

Attest:

BRUCE LEHMAN

Attesting Officer    Commissioner of Patents and Trademarks